US012436232B2

(12) United States Patent
Walker et al.

(10) Patent No.: US 12,436,232 B2
(45) Date of Patent: Oct. 7, 2025

(54) ADAPTIVE FAN NOISE SUPPRESSION FOR TRAFFIC RADAR SYSTEMS

(71) Applicant: Applied Concepts, Inc., Richardson, TX (US)

(72) Inventors: Stanley A. Walker, Flower Mound, TX (US); Steven F. Hocker, Gardner, KS (US); Zhigang Jin, Plano, TX (US); John C. Miller, Lewisville, TX (US)

(73) Assignee: APPLIED CONCEPTS, INC., Richardson, TX (US)

( * ) Notice: Subject to any disclaimer, the term of this patent is extended or adjusted under 35 U.S.C. 154(b) by 0 days.

(21) Appl. No.: 18/128,331

(22) Filed: Mar. 30, 2023

(65) Prior Publication Data

US 2024/0027577 A1 Jan. 25, 2024

Related U.S. Application Data

(60) Provisional application No. 63/390,927, filed on Jul. 20, 2022.

(51) Int. Cl.
*G01S 7/28* (2006.01)

(52) U.S. Cl.
CPC .................. *G01S 7/2813* (2013.01)

(58) Field of Classification Search
CPC ...... G01S 7/2813; G01S 7/52077; G01S 7/22; G01S 7/23; G01S 7/022; G01S 7/023; G01S 13/0209; G01S 3/86
USPC ................. 342/115, 195, 192, 196
See application file for complete search history.

(56) References Cited

U.S. PATENT DOCUMENTS

| 4,620,192 A | | 10/1986 | Collins | |
|---|---|---|---|---|
| 4,719,606 A | * | 1/1988 | Andrieu | G01V 1/001 367/901 |
| 5,034,931 A | * | 7/1991 | Wells | G01S 7/526 367/136 |
| 5,124,710 A | * | 6/1992 | Debuisser | G01S 13/225 342/204 |
| 5,194,908 A | | 3/1993 | Lougheed et al. | |
| 5,349,567 A | * | 9/1994 | Reed | G01S 7/5273 367/901 |
| 5,446,463 A | * | 8/1995 | Beaucourt | H03G 11/00 342/198 |
| 5,504,488 A | * | 4/1996 | Henderson | G01S 7/415 342/115 |
| 5,525,996 A | * | 6/1996 | Aker | G01S 13/92 342/104 |
| 5,528,245 A | * | 6/1996 | Aker | G01S 7/023 342/175 |

(Continued)

OTHER PUBLICATIONS

Radar Handbook, Second Edition, by Merrill I. Skolnik, McGraw-Hill, Copyright 1990, 846 pages.

(Continued)

*Primary Examiner* — Michael W Justice
(74) *Attorney, Agent, or Firm* — Jackson Walker LLP; Christopher J. Rourk

(57) ABSTRACT

A system for processing data, comprising a signal processing system configured to receive and process a reflected wireless data signal from a remote source and a noise suppression system configured to receive the wireless data signal and to detect and suppress harmonic components associated with reflected noise from a local source from the wireless data signal.

20 Claims, 1 Drawing Sheet

(56) References Cited

U.S. PATENT DOCUMENTS

| | | | |
|---|---|---|---|
| 5,528,246 A * | 6/1996 | Henderson | G01S 7/415 342/115 |
| 5,563,603 A * | 10/1996 | Aker | G01S 13/92 342/115 |
| 5,565,871 A * | 10/1996 | Aker | G01S 13/86 340/936 |
| 5,570,093 A * | 10/1996 | Aker | G01S 7/354 342/115 |
| 5,581,517 A * | 12/1996 | Gee | G01S 7/5209 367/138 |
| 5,644,315 A * | 7/1997 | Long | G01S 7/2927 342/99 |
| 5,689,442 A | 11/1997 | Swanson et al. | |
| 5,691,724 A * | 11/1997 | Aker | G01S 7/032 342/115 |
| 5,799,083 A | 8/1998 | Brothers et al. | |
| 5,828,333 A * | 10/1998 | Richardson | G01S 13/325 375/130 |
| 6,031,484 A | 2/2000 | Bullinger et al. | |
| 6,108,071 A | 8/2000 | Landry et al. | |
| 6,163,259 A * | 12/2000 | Barsumian | G01S 7/41 340/572.1 |
| 6,198,427 B1 | 3/2001 | Aker et al. | |
| 6,266,627 B1 | 7/2001 | Gatsonides | |
| 6,332,028 B1 * | 12/2001 | Marash | H04R 3/005 381/92 |
| 6,556,282 B2 | 4/2003 | Jamieson et al. | |
| 6,573,861 B1 * | 6/2003 | Hommel | G01S 7/415 342/192 |
| 6,679,702 B1 | 1/2004 | Rau | |
| 6,811,291 B1 * | 11/2004 | Short, III | G01S 7/52038 324/76.47 |
| 7,002,511 B1 * | 2/2006 | Ammar | G01S 7/032 342/134 |
| 7,085,637 B2 | 8/2006 | Breed et al. | |
| 7,522,093 B2 * | 4/2009 | Nakanishi | G01S 7/36 342/91 |
| 7,663,502 B2 | 2/2010 | Breed | |
| 7,675,458 B2 | 3/2010 | Hubbard et al. | |
| 7,813,822 B1 | 10/2010 | Hoffberg | |
| 7,920,251 B2 | 4/2011 | Chung | |
| 7,961,301 B2 | 6/2011 | Earhart et al. | |
| 8,105,028 B2 * | 1/2012 | Rugger | F03D 7/0276 416/37 |
| 8,384,780 B1 | 2/2013 | Frank et al. | |
| 9,081,085 B2 * | 7/2015 | Fukuda | G01S 13/0209 |
| 9,134,338 B2 | 9/2015 | Cilia et al. | |
| 9,341,706 B2 * | 5/2016 | Ward | G01S 7/412 |
| 9,368,097 B2 * | 6/2016 | Furuta | G10K 11/16 |
| 9,482,751 B2 | 11/2016 | Mandava et al. | |
| 9,575,175 B2 * | 2/2017 | Grooters | G01S 13/933 |
| 9,868,044 B2 * | 1/2018 | Johnson | G01S 7/352 |
| 9,989,637 B2 * | 6/2018 | Rashid | G08G 1/166 |
| 10,055,675 B2 * | 8/2018 | Micks | G06F 30/15 |
| 10,163,432 B2 | 12/2018 | Every | |
| 10,274,588 B2 | 4/2019 | Smits | |
| 10,310,067 B2 * | 6/2019 | Finch | G01S 13/5248 |
| 10,466,338 B2 * | 11/2019 | Al-Mufti | H04B 17/318 |
| 10,514,454 B1 * | 12/2019 | Parrott | G01F 1/663 |
| 10,677,905 B2 * | 6/2020 | Baheti | G01S 13/04 |
| 10,705,198 B2 * | 7/2020 | Santra | G01M 1/16 |
| 10,746,848 B2 * | 8/2020 | Katayama | G01S 13/93 |
| 10,817,736 B2 * | 10/2020 | Banvait | B62D 15/0285 |
| 10,845,461 B2 * | 11/2020 | Phelan | G01S 7/2813 |
| 10,845,463 B2 | 11/2020 | Zhang et al. | |
| 10,866,313 B2 * | 12/2020 | Gassend | G01S 17/931 |
| 10,871,551 B2 * | 12/2020 | Fluhler | G01S 7/2922 |
| 11,300,958 B2 * | 4/2022 | Gassend | G01S 17/89 |
| 11,303,366 B2 * | 4/2022 | Reynolds | H04B 17/345 |
| 11,320,531 B2 * | 5/2022 | Garrec | G01S 13/90 |
| 11,379,541 B2 | 7/2022 | Ricci | |
| 11,396,335 B2 * | 7/2022 | Cunningham | B62D 35/007 |
| 11,402,469 B2 * | 8/2022 | Harman | H01Q 21/205 |
| 11,402,470 B2 * | 8/2022 | Rakshit | G01S 7/415 |
| 2005/0134497 A1 * | 6/2005 | Mafune | G01S 7/285 342/27 |
| 2005/0156780 A1 | 7/2005 | Bonthron et al. | |
| 2008/0111731 A1 | 5/2008 | Hubbard et al. | |
| 2008/0180312 A1 * | 7/2008 | Nakanishi | G01S 13/345 342/91 |
| 2009/0202347 A1 * | 8/2009 | Rugger | F03D 7/0224 416/31 |
| 2010/0292886 A1 | 11/2010 | Szczerba et al. | |
| 2011/0223031 A1 * | 9/2011 | Bond | F03D 80/30 342/159 |
| 2013/0285847 A1 * | 10/2013 | Ward | H01Q 3/267 342/90 |
| 2013/0314268 A1 * | 11/2013 | Fukuda | G01S 13/584 342/21 |
| 2014/0062753 A1 * | 3/2014 | Grooters | G01S 13/87 342/21 |
| 2014/0098968 A1 * | 4/2014 | Furuta | G10L 21/0232 381/71.12 |
| 2014/0191896 A1 * | 7/2014 | Johnson | G01S 13/58 342/104 |
| 2014/0378809 A1 * | 12/2014 | Weitnauer | A61B 5/24 600/407 |
| 2015/0162014 A1 * | 6/2015 | Zhang | G10L 25/15 704/206 |
| 2016/0069993 A1 * | 3/2016 | Finch | G01S 13/5248 342/36 |
| 2016/0161596 A1 * | 6/2016 | Parrott | G01S 7/415 342/159 |
| 2016/0170021 A1 * | 6/2016 | Rashid | G01S 13/931 342/70 |
| 2016/0178731 A1 * | 6/2016 | Stove | G01S 7/41 342/93 |
| 2016/0339320 A1 * | 11/2016 | Johnson | G06F 1/1626 |
| 2017/0153315 A1 * | 6/2017 | Katayama | G01S 13/38 |
| 2017/0192088 A1 * | 7/2017 | Fluhler | G01S 7/2922 |
| 2017/0364776 A1 * | 12/2017 | Micks | G01S 17/006 |
| 2018/0017663 A1 * | 1/2018 | Al-Mufti | G01S 7/021 |
| 2018/0348341 A1 * | 12/2018 | Phelan | G01S 7/023 |
| 2018/0356507 A1 * | 12/2018 | Ichinose | B64U 50/19 |
| 2019/0011544 A1 * | 1/2019 | Gassend | G01S 17/86 |
| 2019/0018416 A1 * | 1/2019 | Gassend | G05D 1/0246 |
| 2019/0033847 A1 | 1/2019 | Cella et al. | |
| 2019/0094350 A1 * | 3/2019 | Baheti | G01S 7/415 |
| 2019/0137605 A1 * | 5/2019 | Harman | G01S 13/424 |
| 2019/0266422 A1 * | 8/2019 | Banvait | G08G 1/143 |
| 2019/0302252 A1 * | 10/2019 | Santra | G01F 1/663 |
| 2019/0394097 A1 | 12/2019 | Ricci | |
| 2020/0067613 A1 * | 2/2020 | Reynolds | H04B 17/345 |
| 2020/0070829 A1 | 3/2020 | Martinez et al. | |
| 2020/0182967 A1 * | 6/2020 | Rakshit | G01M 99/005 |
| 2020/0200890 A1 * | 6/2020 | Garrec | G01S 13/585 |
| 2020/0355827 A1 * | 11/2020 | Smothermon | G01S 17/88 |
| 2020/0377158 A1 * | 12/2020 | Cunningham | B62D 37/02 |
| 2021/0405179 A1 * | 12/2021 | Graham | G01S 13/345 |
| 2022/0349986 A1 * | 11/2022 | Wu | G01S 7/354 |
| 2022/0361768 A1 | 11/2022 | McMahon et al. | |
| 2023/0150681 A1 * | 5/2023 | Ramakrishnan | F02C 9/20 60/773 |
| 2024/0030875 A1 * | 1/2024 | Mohammadnezhad | H03F 1/3205 |

OTHER PUBLICATIONS

PRO-1000DS "Traffic Safety Radar System" Operator's Manual ("PRO-1000DS Manual"), Kustom Signals, Inc., Copyright 2000, 37 pages.

* cited by examiner

ADAPTIVE FAN NOISE SUPPRESSION FOR TRAFFIC RADAR SYSTEMS

RELATED APPLICATIONS

The present application claims priority to and benefit of U.S. Provisional patent application No. 63/390,927, filed Jul. 20, 2022, which is hereby incorporated by reference for all purposes as if set forth herein in its entirety.

TECHNICAL FIELD

The present disclosure relates generally to radar speed detection devices and systems, and more specifically to a system and method for adaptive fan noise suppression for traffic radar systems.

BACKGROUND OF THE INVENTION

Noise sources can cause radar system misoperation and affect reliability.

SUMMARY OF THE INVENTION

A system for processing data is disclosed that has a signal processing system that receives and processes a wireless data signal, such as a reflected radar signal that is generated by the signal processing system. A fan noise suppression system receives the wireless data signal and detects and suppresses harmonic components associated with reflected fan noise, such as by electromagnetic frequency reflected by the fan or other structures, from the wireless data signal.

A system for processing data is disclosed that has a signal processing system that receives and processes a reflected wireless data signal from a remote source. A noise suppression system receives the wireless data signal and detects and suppresses harmonic components associated with reflected noise from a local source from the wireless data signal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
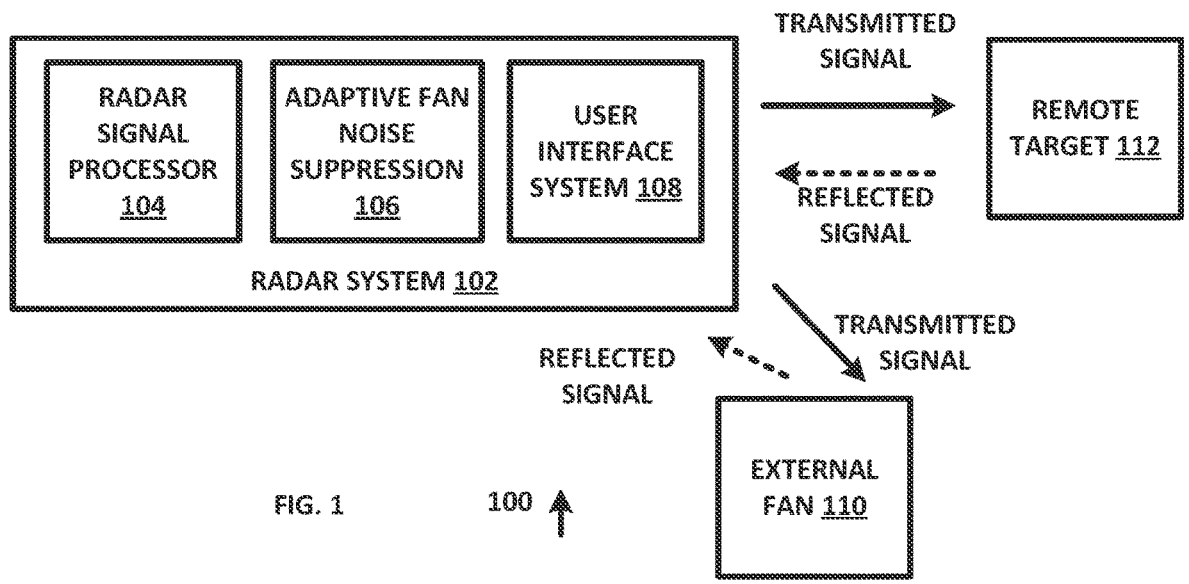
FIG. 1 is a diagram of a system 100 for adaptive fan noise suppression for traffic radar systems, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Radar systems with antennas that are installed inside vehicles will typically have some of the radar energy reflected off of the windshield and into the dash/console area. The scattered signals are prone to false target returns caused by AC blowers, fuel pumps or any constant mechanical motion device that can provide a Doppler return signal. The signal return from the rotating blades of an AC blower typically appears as a series of three or four targets that are harmonically related to each other. The problem is further complicated by the fact that the fan speed tends to change due to either user input or an automatic climate control system, and the power supply can also generate various frequency noise components that can migrate into the systems components and into other wireless signals.

To address this previously unidentified problem, the present disclosure provides an automatic system and algorithm for suppressing fan noise and other related noise, which requires no inputs by the user other than selection of user options from a user interface device. The present disclosure is fully adaptive to allow for automatic fan noise suppression even if the fan speed changes.

Fan noise and other local reflected noise can be differentiated from a normal Doppler target signal by the presence of even/odd harmonics. Therefore, a fan signal whose fundamental harmonic frequency is at N hertz will also have harmonics located at 2*N, 3*N, 4*N hertz and so on. Fan noise signal strength is also typically limited and constant relative to normal Doppler signals.

FIG. 1 is a diagram of a system 100 for adaptive fan noise suppression for traffic radar systems, in accordance with an example embodiment of the present disclosure. System 100 includes radar system 102, radar signal processor 104, adaptive fan noise suppression system 106, user interface system 108, external fan 110 and remote target 112, each of which can be implemented in hardware or a suitable combination of hardware and software.

Radar system 102 can include one or more components and sub-systems that are used for generating a transmitted electromagnetic signal, receiving a reflected electromagnetic signal and for performing other suitable functions as discussed and described herein. Radar system 102 can include one or more processors for performing analog and digital signal processing, for generating user displays and for other suitable purposes.

Radar signal processor 104 can be implemented as one or more algorithms operating on a processor, either alone or in conjunction with special purpose digital and analog data processing hardware systems, which cause the processor and any associated components to process radar signals. In one example embodiment, radar signal processor 104 can perform frequency domain analysis on electromagnetic signals, such as by performing a Fast Fourier Transform to identify frequency components (also known as bins) and associated signal strength components, on a frame by frame basis or in other suitable manners. As used herein, a frame can include a pre-defined collection of radar data and is on-going or continuous, or other suitable radar data such as individual sets of Fourier-transformed data. The data can be stored in a buffer as a series of time steps in order to facilitate processing, and selected processed data can be used in conjunction with statistical processing, signal processing or in other suitable manners.

Adaptive fan noise suppression system 106 can be implemented as one or more algorithms operating on a processor, either alone or in conjunction with special purpose digital and analog data processing hardware systems, which cause the processor and any associated components to identify fan noise or other local noise sources that generate frequency components at a harmonic of a base frequency. In one example embodiment, the power and harmonic profile is measured and summed for each possible set of fan noise harmonics in the range of interest on a frame by frame basis. The power is the sum of each harmonic signal-to-noise measurement in the set that is reasonable for fan noise. In one example embodiment, previously-identified ranges for local reflected noise components can be entered as stored data, local reflected noise components can be identified as a function of signal strength and frequency profiles (where local reflected noise does not change as a function of vehicle speed or time, but changes as a function of radar signal strength), or other suitable processes can also or alternatively be used to identify expected or reasonable candidates for local reflected noise. The profile is the sum of the relative signal-to-noise measurements in the set that is reasonable for local noise. The total sum for each harmonic set that is measured can be referred to as the harmonic weight. If the harmonic weight is above a minimum threshold, then each harmonic can be filtered to prevent it from appearing on the user interface system 108 display. Legitimate target systems can be displayed when they exceed predetermined harmonic weight levels.

User interface system 108 can be implemented as one or more algorithms operating on a processor, which cause the processor to generate a user interface that includes data and one or more user interface controls. In one example embodiment, user interface system 108 can generate a prompt to allow a user to select fan noise suppression, can allow the user to stop using fan noise suppression, can display suspected fan noise or other noise components to a user and can perform other suitable functions. User interface system 108 can be used to indicate when only fan noise or other noise sources should be present, such as when a patrol vehicle is not presently in range of a remote target or directed at any moving vehicles, so as to allow the local noise sources to be detected when there are no potential remote target signals present.

External fan 110 is an example of a local noise source that is located in the vicinity of radar system 102. External fan 110 can receive reflected noise signals from the radar signal source, a second reflection of the reflected radar signal from a target, or other suitable reflected noise signals. Likewise, other noise sources can generate noise that is processed by adaptive fan noise suppression system 106.

Remote target 112 can be a moving vehicle or other suitable targets that are monitored for speed data or other suitable data. In one example embodiment, remote target 112 can change its distance and speed relative to the transmitting radar unit, which can result in reflected signals that can fall within a frequency range that overlaps with noise signals from external fan 110 or other local reflected noise signals.

In operation, system 100 allows local reflected noise signals to be identified and suppressed, to improve the ability to identify reflected signals from remote targets. System 100 thus prevents spurious target detection signals and confusion between targets and local noise.

Figure 2:
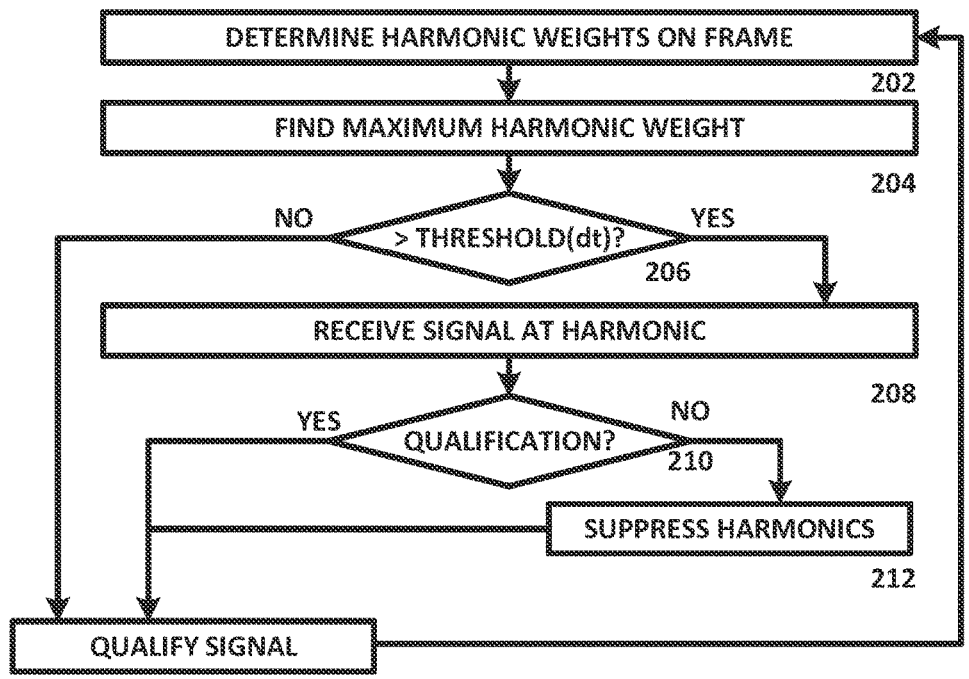
FIG. 2 is a diagram of an algorithm 200 for adaptive fan noise suppression for traffic radar systems, in accordance with an example embodiment of the present disclosure.

FIG. 2 is a diagram of an algorithm 200 for adaptive fan noise suppression for traffic radar systems, in accordance with an example embodiment of the present disclosure. Algorithm 200 can be implemented in hardware or a suitable combination of hardware and software.

Algorithm 200 begins at 202, where the power and harmonic profile is measured and summed for each possible set of local reflected noise harmonics in the range of interest on a frame-by-frame basis. The local reflected noise can have a predetermined known frequency, a user-entered frequency, can be independently measured or other suitable processes can also or alternatively be used to determine the expected local reflected noise harmonics. In one example embodiment, radar data can be received in a series of predefined collections of data that are ongoing or continuous, or in other suitable manners. The values for each harmonic set that is measured can be referred to as the harmonic weight, and the harmonic weight data can be stored in an array or in other suitable data structures.

At 204, the array or other data structure is searched for the maximum harmonic weight. The index (N) of the maximum weight identifies the location of likely local reflected noise. Each harmonic then is located at N, 2N, 3N and 4N.

At 206, it is determined whether the harmonic weight is above a minimum threshold. If so, then the algorithm proceeds to 208 where if one or more remote targets appear at the same frequency as any of the harmonics, it will become a candidate for qualification if it has a strength that is a pre-defined level above the level of the harmonic. This is determined at 210 and if a signal's strength is above the pre-defined level, the algorithm proceeds to 214 for qualification as a remote target. If the test at 210 is not above the pre-defined level, the algorithm proceeds to 212.

At 212, the suppression algorithm filters each harmonic at N, 2N, 3N, 4N and at other suitable harmonics before proceeding to 214 for remote-target qualification. Once the qualification operation is complete, the algorithm proceeds to 202. Likewise, a separate training mode and speed detection mode can be used to facilitate training and speed detection, or other suitable processes can also or alternatively be used.

In operation, algorithm 200 can be used for adaptive fan noise suppression for traffic radar systems. While algorithm 200 is shown as a flow chart, a person of skill in the art will recognize that it can also or alternatively be implemented using objected oriented programming, as a state diagram, as a ladder diagram, in other suitable manners, and on one or more processors.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for processing data, comprising:
   a signal processing system configured to receive and process a reflected wireless data signal from a remote source; and
   a noise suppression system configured to receive the wireless data signal and to detect and suppress harmonic components associated with reflected noise from a local source from the wireless data signal when a harmonic weight is above a threshold,
   wherein the harmonic weight is a sum of a set of the harmonics for a given frame.

2. The system of claim 1 wherein the noise suppression system is configured to process a frame of the wireless data signal.

3. The system of claim 1 wherein the signal processing system is configured to process the wireless data signal to generate a frame of frequency data and the noise suppression system is configured to process the frame of frequency data to identify one or more harmonic weights.

4. The system of claim 1 wherein the signal processing system is configured to process the wireless data signal to generate a frame of frequency data and the noise suppression system is configured to process the frame of frequency data to identify a maximum harmonic weight.

5. The system of claim 1 wherein the signal processing system is configured to process the wireless data signal to generate a frame of frequency data and the noise suppression system is configured to process the frame of frequency data to identify whether the harmonic weight has exceeded the threshold for a predetermined period of time.

6. A system for processing data, comprising:
   a signal processing system configured to receive and process a reflected wireless data signal from a remote source to convert the wireless data signal into a plurality of frequency bins; and a noise suppression system configured to receive the wireless data signal and to detect and suppress harmonic components in the frequency bins that are associated with local reflected noise from the wireless data signal when a harmonic weight is above a threshold, wherein the harmonic weight is a sum of a set of the harmonics for a given frame.

7. The system of claim 6 wherein the noise suppression system is configured to process a frame of the wireless data signal.

8. The system of claim 6 wherein the signal processing system is configured to process the wireless data signal to generate a frame of frequency data and the noise suppression system is configured to process the frame of frequency data to identify one or more harmonic weights.

9. The system of claim 6 wherein the signal processing system is configured to process the wireless data signal to generate a frame of frequency data and the noise suppression system is configured to process the frame of frequency data to identify a maximum harmonic weight.

10. The system of claim 6 wherein the signal processing system is configured to process the wireless data signal to generate a frame of frequency data and the noise suppression system is configured to process the frame of frequency data to identify whether the harmonic weight has exceeded the threshold for a predetermined period of time.

11. A system for processing data, comprising:
a signal processing system configured to transmit a radio frequency signal and to receive and process a reflected radio frequency signal from a remote target to generate a wireless data signal; and
a noise suppression system configured to receive the wireless data signal and to suppress harmonic components associated with noise from a local reflection of a structure attached to the system from the wireless data signal when a harmonic weight is above a threshold,
wherein the harmonic weight is a sum of a set of the harmonics for a given frame.

12. The system of claim 11 wherein the noise suppression system is configured to process a frame of the wireless data signal into a plurality of frequency components.

13. The system of claim 11 wherein the signal processing system is configured to process the wireless data signal to generate a frame of frequency data that includes a plurality of bins and the noise suppression system is configured to process the frame of frequency data to identify one or more harmonic weights of associated with the noise in the frequency bins.

14. The system of claim 11 wherein the signal processing system is configured to process the wireless data signal to generate a frame of frequency data and the noise suppression system is configured to process the frame of frequency data to identify a maximum harmonic weight associated with fan noise.

15. The system of claim 11 wherein the signal processing system is configured to process the wireless data signal to generate a frame of frequency data and the noise suppression system is configured to process the frame of frequency data to identify whether the harmonic weight has exceeded the threshold for a predetermined period of time.

16. The system of claim 1 wherein the local reflected noise is received from an attached structure.

17. The system of claim 6 wherein the system is disposed in a vehicle and the local reflected noise is received from a structure attached to the vehicle.

18. The system of claim 1, wherein a signal-of-interest is qualified as a target when the signal-of-interest is above a pre-defined level.

19. The system of claim 6, wherein a signal-of-interest is qualified as a target when the signal-of-interest is above a pre-defined level.

20. The system of claim 11, wherein a signal-of-interest is qualified as the target when the signal-of-interest is above a pre-defined level.

* * * * *